US012079101B2

United States Patent
Dar et al.

(10) Patent No.: US 12,079,101 B2
(45) Date of Patent: Sep. 3, 2024

(54) SYSTEM AND METHOD FOR MODELING AND FORECASTING INPUT/OUTPUT (IO) PERFORMANCE USING ADAPTABLE MACHINE LEARNING

(71) Applicant: EMC IP Holding Company, LLC, Hopkinton, MA (US)

(72) Inventors: Shaul Dar, Petach Tikva (IL); Avitan Gefen, Tel Aviv (IL); David Sydow, Merrimack, NH (US); Anil Kumar Koluguri, Durham, NC (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 112 days.

(21) Appl. No.: 17/727,046

(22) Filed: Apr. 22, 2022

(65) Prior Publication Data

US 2023/0342280 A1    Oct. 26, 2023

(51) Int. Cl.
*G06F 11/34* (2006.01)
*G06F 3/06* (2006.01)
*G06N 5/02* (2023.01)
*G06N 20/20* (2019.01)

(52) U.S. Cl.
CPC ........... *G06F 11/3485* (2013.01); *G06N 5/02* (2013.01)

(58) Field of Classification Search
CPC .......................... G06F 3/0611; G06F 9/4881
See application file for complete search history.

(56) References Cited

U.S. PATENT DOCUMENTS

| 2007/0294552 A1* | 12/2007 | Kakihara | G06F 3/0653 713/320 |
| 2010/0115154 A1* | 5/2010 | Tomonaga | G06F 13/4022 710/38 |
| 2013/0007757 A1* | 1/2013 | Chambliss | G06F 9/4881 718/103 |
| 2021/0109658 A1* | 4/2021 | Mallick | G06F 3/0611 |
| 2022/0121382 A1* | 4/2022 | Meiri | G06F 3/0611 |

* cited by examiner

*Primary Examiner* — Getente A Yimer
(74) *Attorney, Agent, or Firm* — Brian J. Colandreo; Heath M. Sargeant; Holland & Knight LLP

(57) ABSTRACT

A method, computer program product, and computing system for processing historical input/output (IO) performance data associated with one or more storage objects of a storage system. A plurality of IO modeling systems may be trained using the historical IO performance data. Modeling performance information may be determined for the plurality of IO modeling systems across the historical IO performance data. A forecast score may be determined for each IO modeling system based on the modeling performance information for the plurality of IO modeling systems. A subset of the plurality of IO modeling systems may be selected based upon the forecast score for each IO modeling system. The at least one IO modeling system may be trained using the historical IO performance data. IO performance data may be forecasted using the at least one trained IO modeling system from the subset of the plurality of IO modeling systems.

18 Claims, 12 Drawing Sheets

SYSTEM AND METHOD FOR MODELING AND FORECASTING INPUT/OUTPUT (IO) PERFORMANCE USING ADAPTABLE MACHINE LEARNING

BACKGROUND

Storing and safeguarding electronic content may be beneficial in modern business and elsewhere. Accordingly, various methodologies may be employed to protect and distribute such electronic content.

Demand in storage systems fluctuate following the business cycles these systems serve. As usage demands on a storage system increase over time, the aggregate amount of resources available for performing storage operations will decrease. It may be beneficial if the storage system could forecast the future consumption of various system resources. Using such forecasts, resources may be allocated for the future growth of the relevant application workloads. In addition, prompt notifications may prevent critical failures and escalations.

SUMMARY OF DISCLOSURE

In one example implementation, a computer-implemented method executed on a computing device may include, but is not limited to, processing historical input/output (IO) performance data associated with one or more storage objects of a storage system. A plurality of IO modeling systems may be trained using the historical IO performance data. Modeling performance information may be determined for the plurality of IO modeling systems across the historical IO performance data. A forecast score may be determined for each IO modeling system based on the modeling performance information for the plurality of IO modeling systems. A subset of the plurality of IO modeling systems may be selected based upon the forecast score for each IO modeling system. The at least one IO modeling system may be trained using the historical IO performance data. IO performance data may be forecasted using the at least one trained IO modeling system from the subset of the plurality of IO modeling systems.

One or more of the following example features may be included. Processing historical input/output (IO) performance data associated with one or more storage objects of a storage system may include one or more of: removing one or more duplicate portions of historical IO performance data; and performing time-series interpolation on the historical IO performance data. Training a plurality of IO modeling systems using the historical IO performance data may include: training the plurality of IO modeling systems with a first portion of a plurality of portions of the historical IO performance data; and testing the plurality of IO modeling systems with a second portion of the plurality of portions of the historical IO performance data. The training and testing may be iteratively repeated for each portion of the plurality of portions of the historical IO performance data. Determining a forecast score for each IO modeling system based on the modeling performance information for the plurality of IO modeling systems may include: determining a median value of the Symmetric Mean Absolute Percentage Error across the historical IO performance data for each IO modeling system; and determining a Symmetric Mean Absolute Percentage Error standard deviation for each IO modeling system. Selecting a subset of the plurality of IO modeling systems based upon, at least in part, the forecast score for each IO modeling system may include: selecting the subset of the plurality of IO modeling systems based upon, at least in part, the median value of the Symmetric Mean Absolute Percentage error across the historical IO performance data for each IO modeling system and the Symmetric Mean Absolute Percentage Error standard deviation for each IO modeling system. New IO performance data for the one or more storage objects may be received. It may be determined whether to retrain the at least one trained IO modeling system based upon, at least in part, one or more of: a comparison of the historical IO performance data to the new IO performance data for the one or more storage objects; and a performance degradation of the at least one trained IO modeling system with the new IO performance data for the one or more storage objects.

In another example implementation, a computer program product resides on a computer readable medium that has a plurality of instructions stored on it. When executed by a processor, the instructions cause the processor to perform operations that may include, but are not limited to, processing historical input/output (IO) performance data associated with one or more storage objects of a storage system. A plurality of IO modeling systems may be trained using the historical IO performance data. Modeling performance information may be determined for the plurality of IO modeling systems across the historical IO performance data. A forecast score may be determined for each IO modeling system based on the modeling performance information for the plurality of IO modeling systems. A subset of the plurality of IO modeling systems may be selected based upon the forecast score for each IO modeling system. The at least one IO modeling system may be trained using the historical IO performance data. IO performance data may be forecasted using the at least one trained IO modeling system from the subset of the plurality of IO modeling systems.

One or more of the following example features may be included. Processing historical input/output (IO) performance data associated with one or more storage objects of a storage system may include one or more of: removing one or more duplicate portions of historical IO performance data; and performing time-series interpolation on the historical IO performance data. Training a plurality of IO modeling systems using the historical IO performance data may include: training the plurality of IO modeling systems with a first portion of a plurality of portions of the historical IO performance data; and testing the plurality of IO modeling systems with a second portion of the plurality of portions of the historical IO performance data. The training and testing may be iteratively repeated for each portion of the plurality of portions of the historical IO performance data. Determining a forecast score for each IO modeling system based on the modeling performance information for the plurality of IO modeling systems may include: determining a median value of the Symmetric Mean Absolute Percentage Error across the historical IO performance data for each IO modeling system; and determining a Symmetric Mean Absolute Percentage Error standard deviation for each IO modeling system. Selecting a subset of the plurality of IO modeling systems based upon, at least in part, the forecast score for each IO modeling system may include: selecting the subset of the plurality of IO modeling systems based upon, at least in part, the median value of the Symmetric Mean Absolute Percentage error across the historical IO performance data for each IO modeling system and the Symmetric Mean Absolute Percentage Error standard deviation for each IO modeling system. New IO performance data for the one or more storage objects may be received. It may be determined whether to retrain the at least one trained IO modeling system based upon, at least in part, one or more of: a comparison of the historical IO performance data to the new IO performance data for the one or more storage objects; and a performance degradation of the at least one trained IO modeling system with the new IO performance data for the one or more storage objects.

In another example implementation, a computing system includes at least one processor and at least one memory architecture coupled with the at least one processor, wherein the at least one processor is configured to process historical input/output (IO) performance data associated with one or more storage objects of a storage system. The at least one processor may be further configured to train a plurality of IO modeling systems using the historical IO performance data. The at least one processor may be further configured to determine modeling performance information for the plurality of IO modeling systems across the historical IO performance data. The at least one processor may be further configured to determine a forecast score for each IO modeling system based on the modeling performance information for the plurality of IO modeling systems. The at least one processor may be further configured to select a subset of the plurality of IO modeling systems based upon, at least in part, the forecast score for each IO modeling system. The at least one processor may be further configured to train at least one IO modeling system from the subset of the plurality of IO modeling systems using the historical IO performance data. The at least one processor may be further configured to forecast IO performance data for the one or more storage objects using the at least one trained IO modeling system from the subset of the plurality of IO modeling systems.

One or more of the following example features may be included. Processing historical input/output (IO) performance data associated with one or more storage objects of a storage system may include one or more of: removing one or more duplicate portions of historical IO performance data; and performing time-series interpolation on the historical IO performance data. Training a plurality of IO modeling systems using the historical IO performance data may include: training the plurality of IO modeling systems with a first portion of a plurality of portions of the historical IO performance data; and testing the plurality of IO modeling systems with a second portion of the plurality of portions of the historical IO performance data. The training and testing may be iteratively repeated for each portion of the plurality of portions of the historical IO performance data. Determining a forecast score for each IO modeling system based on the modeling performance information for the plurality of IO modeling systems may include: determining a median value of the Symmetric Mean Absolute Percentage Error across the historical IO performance data for each IO modeling system; and determining a Symmetric Mean Absolute Percentage Error standard deviation for each IO modeling system. Selecting a subset of the plurality of IO modeling systems based upon, at least in part, the forecast score for each IO modeling system may include: selecting the subset of the plurality of IO modeling systems based upon, at least in part, the median value of the Symmetric Mean Absolute Percentage error across the historical IO performance data for each IO modeling system and the Symmetric Mean Absolute Percentage Error standard deviation for each IO modeling system. New IO performance data for the one or more storage objects may be received. It may be determined whether to retrain the at least one trained IO modeling system based upon, at least in part, one or more of: a comparison of the historical IO performance data to the new IO performance data for the one or more storage objects; and a performance degradation of the at least one trained IO modeling system with the new IO performance data for the one or more storage objects.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
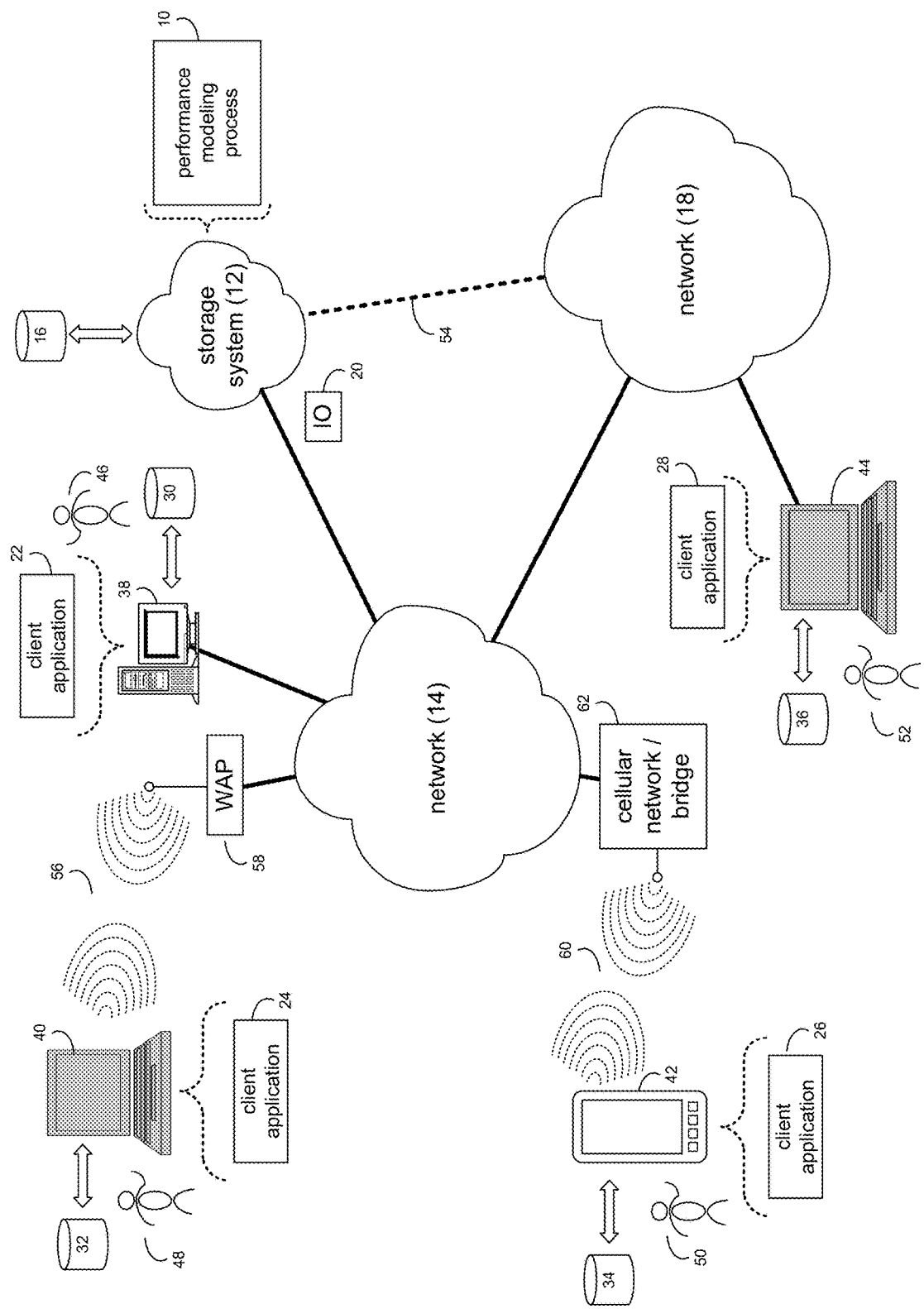
FIG. 1 is an example diagrammatic view of a storage system and a performance modeling process coupled to a distributed computing network according to one or more example implementations of the disclosure.

Referring to FIG. 1, there is shown performance modeling process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of performance modeling process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of performance modeling process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a performance modeling process, such as performance modeling process 10 of FIG. 1, may include but is not limited to, processing historical input/output (IO) performance data associated with one or more storage objects of a storage system. A plurality of IO modeling systems may be trained using the historical IO performance data. Modeling performance information may be determined for the plurality of IO modeling systems across the historical IO performance data. A forecast score may be determined for each IO modeling system based on the modeling performance information for the plurality of IO modeling systems. A subset of the plurality of IO modeling systems may be selected based upon, at least in part, the forecast score for each IO modeling system. The at least one IO modeling system from the subset of the plurality of IO modeling systems may be trained using the historical IO performance data. IO performance data for the one or more storage objects may be forecast using the at least one trained IO modeling system from the subset of the plurality of IO modeling systems.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

The Storage System

Figure 2:
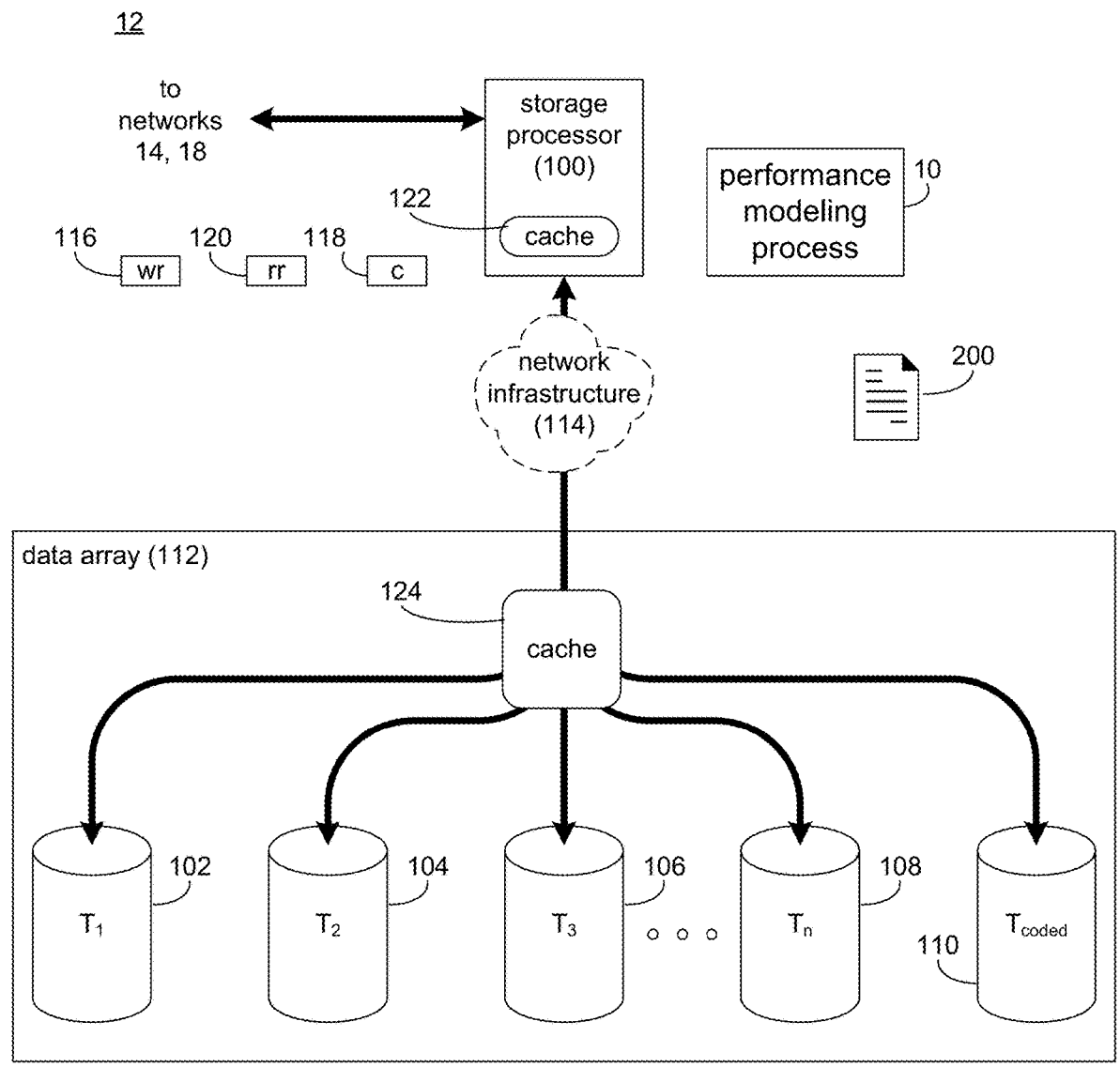
FIG. 2 is an example diagrammatic view of the storage system of FIG. 1 according to one or more example implementations of the disclosure.
Figure 3:
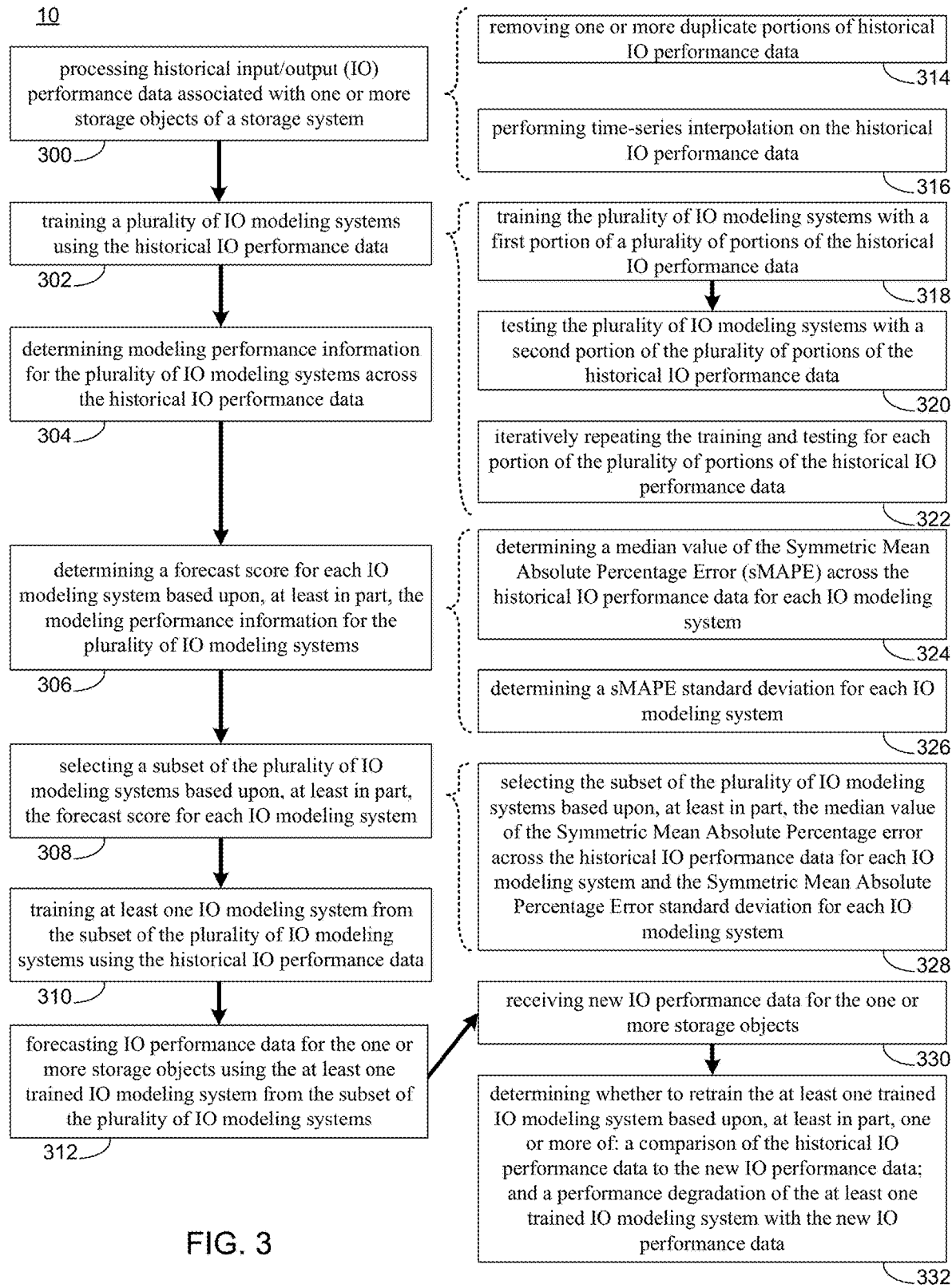
FIG. 3 is an example flowchart of performance modeling process according to one or more example implementations of the disclosure.

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of performance modeling process 10. The instruction sets and subroutines of performance modeling process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of performance modeling process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of performance modeling process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of performance modeling process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Performance Modeling Process

Referring also to the examples of FIGS. 3-12 and in some implementations, performance modeling process 10 may process 300 historical input/output (IO) performance data associated with one or more storage objects of a storage system. A plurality of IO modeling systems may be trained 302 using the historical IO performance data. Modeling performance information may be determined 304 for the plurality of IO modeling systems across the historical IO performance data. A forecast score may be determined 306 for each IO modeling system based on the modeling performance information for the plurality of IO modeling systems. A subset of the plurality of IO modeling systems may be selected 308 based upon, at least in part, the forecast score for each IO modeling system. The at least one IO modeling system from the subset of the plurality of IO modeling systems may be trained 310 using the historical IO performance data. IO performance data for the one or more storage objects may be forecasted 312 using the at least one trained IO modeling system from the subset of the plurality of IO modeling systems.

As will be discussed in greater detail below, implementations of the present disclosure may allow for the forecasting of a storage system's performance over time using adaptive machine learning. For example, forecasting storage system performance can be mapped in a straightforward manner to time-series analysis and forecasting, where given a historical sequence of observed numerical values, a mathematical algorithm is used to predict the most likely values to appear next in the sequence. However in practice using traditional time-series algorithms, such as ARIMA or Holt-winters to forecast resources utilization in real storage systems with precise and reliable outcomes is challenging for several reasons:

IO patterns can exhibit very different behaviors over time (e.g., stable over time, bursty or erratic, following some trend, seasonal, cyclic, noisy, etc.).

One machine learning system/IO modeling system may perform well for one pattern but very badly for another. Different algorithms may be optimal for different configurations, such as short-term vs. long term forecasting.

There are a large number of models available and executing all of them would consume too much time and computing power.

A storage system utilizes multiple resources, such as CPU, RAM, network ports and media types, and there are many relevant performance metrics that may influence the system performance, such as a number of input/output per second (IOPs), latency, throughput, etc. Combining all these potential metrics into one value that captures the system state is a difficult task.

Usage patterns, even for a single storage object (e.g. volume) and moreover for a collection of storage objects (e.g. all the IO requests issued by a host or received by a storage appliance) change over time.

The importance of such forecasting is amplified by the fact that effective performance of a storage system may be compromised well before its resources, such as CPU and memory, reach 100% utilization. For example, if the storage system's memory consumption has grown from e.g., 20% to e.g., 80% of the total, but response time at the 80% point has already climbed to 100 times its value at the 20% point, then the storage objects on the system are effectively unserviceable.

As will be discussed in greater detail below, implementations of the present disclosure may:

Adapt to a wide range of time series input sand configurations by using an "ensemble" approach to execute a suite of algorithms in parallel and pick the best IO modeling system (or combination).

Perform a quick analysis to narrow down the list of potential IO modeling systems.

Run many experiments for each candidate model using the "walk forward" approach, a supervised machine learning method that measures the prediction error over the historical data.

Select the most "stable" model according to the input data, one that may not be the best one for any single sequence but will work well across a wide range of datasets (i.e. will not have a large error on any input).

Use a system "headroom" concept combined with relevant performance indicators to forecast the overall system behavior in a flexible and reliable manner.

Monitor the selected IO modeling system for signs of "model drift" (resulting e.g. from "data drift" and/or "concept drift") and trigger retraining of the selected IO modeling system.

Accordingly, performance modeling process 10 may allow for IO performance to be modeled and forecasted over time by utilizing historical IO performance data to train and test a plurality of IO modeling systems; determining forecast scores that account for the accuracy of each IO modeling system over the historical IO performance data; and selecting the most effective IO modeling system(s) using the forecast scores. In this manner, performance modeling process 10 may improve the forecasting of IO performance for a storage system over conventional systems and may utilize the forecasted IO performance to perform some remedial action (e.g., generate an alert for a storage administrator; provide recommendations based on the forecasted IO performance; and/or automatically adjust storage system properties (e.g., add or remove allocated storage space; throttle particular IO requests at specific points in time; etc.)).

In some implementations, performance modeling process 10 may process 300 historical input/output (IO) performance data associated with one or more storage objects of a storage system. IO performance data may generally include host IO metrics that represent the IO processing performance for a storage system. Examples of IO performance data may include, but are not limited to, latency, read input/outputs per second (IOPS), write IOPS, total IOPS, and bandwidth. As will be discussed in greater detail below, IO performance data (e.g., in terms of latency, read IOPS, write IOPS, total IOPS, bandwidth, etc.) will be forecast using an adaptive machine learning technique based on historical IO performance data and trends. In some implementations, the historical IO performance data may be associated with one or more storage objects of a storage system. Storage objects may generally include any container or storage unit configured to store data within a storage system. For example, a storage objects may be any one of the following: a volume (aka Logical Unit Number (LUN)), a file, or parts thereof that may be defined e.g. by offsets or address ranges (e.g., sub-LUNs, disk extents, and/or slices).

While reference has been made to particular storage objects (i.e., one or more storage objects), the historical IO performance data may be defined for various levels of storage system granularity. For example, performance modeling process 10 may process 300 historical IO performance data for a collection of storage objects; historical IO performance data for storage objects associated with a particular customer/entity; historical IO performance data for particular storage devices; and/or historical IO performance data for the entire storage system. Historical IO performance data may be stored locally within a particular storage system, may be stored remotely in a network-accessible location, and/or may be stored in a distributed manner across local and/or remote storage devices. In this manner, performance modeling process 10 may import and/or otherwise access historical IO performance data for processing 300.

Processing 300 historical input/output (IO) performance data associated with one or more storage objects of a storage system may include one or more of: removing 314 one or more duplicate portions of historical IO performance data; and performing 316 time-series interpolation on the historical IO performance data. For example, performance modeling process 10 may remove 314 one or more duplicate portions of historical IO performance data by re-indexing the historical IO performance data according to the original data frequency (i.e., resampling the historical IO performance data and using the mean to remove duplications). Performance modeling process 10 may perform 316 time-series data interpolation to fill-in missing values within the historical IO performance data and remove extreme minimum and/or maximum values. For example, performance modeling process 10 may remove values that are not real performance data (i.e., values that are determined (with a threshold level of probability) to be noise).

Performance modeling process 10 may update the given time-series cross-validation period sizes of the historical IO performance data to be aligned with the forecast frequency. For example, suppose performance modeling process 10 receives the following input parameters to process 300 historical IO performance data: start_train_size: 60*24=1, 440; max_train_size: 60*24=1,440; step_size: 11*24=264; and forecast horizon: 60*24=1,440. In this example, the input parameter "start_train_size" may represent the starting window size (e.g., 60 days). The input parameter "max_train_size" may represent the maximum length for the training data for a single train and evaluation test. "Step_size" may represent the number of tests performed for each candidate forecasting model and "forecast_horizon" may represent the desired prediction length for model to perform over. Suppose that the given data is the raw performance metric's sampled value on e.g., an hourly basis, and that the forecasting is requested to be daily. In this example, performance modeling process 10 may update the given time-series cross-validation period sizes of the historical IO performance data to be aligned with the forecast frequency by dividing the configured cross-validation periods by e.g., 24 (the time-frequency conversion multiplier). In this example, if the start_train_size parameter was configured to be 1,440 (e.g., 60*24), performance modeling process 10 may convert the value to 60 (e.g., 1,440/24). While an example of aligning hourly historical IO performance data to a daily forecast frequency has been described, it will be appreciated that performance modeling process 10 may perform time-series cross-validation to convert any sampled historical IO performance data to any desired forecasting frequency within the scope of the present disclosure. Performance modeling process 10 may perform data aggregation on at least a portion of the historical IO performance data. For example, performance modeling process 10 may perform data aggregation on at least a portion of the historical IO performance data whenever forecasting is required in a higher resolution/frequency than the resolution of the historic IO performance data. It will be appreciated that the specific aggregation approach may vary for different use cases and/or data characteristics.

Figure 4:
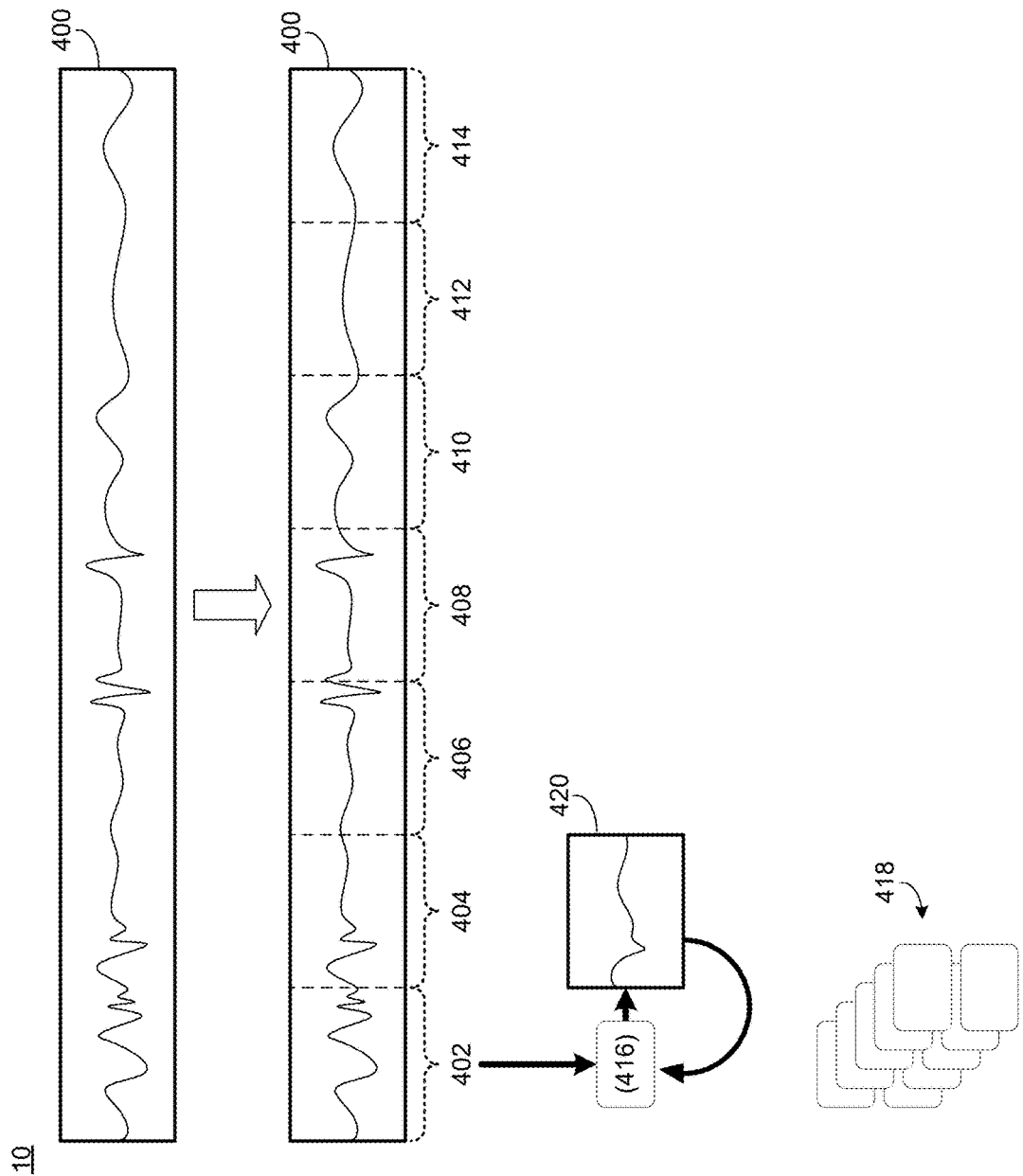
FIGS. 4-10 are example diagrammatic views of the training and testing of IO modeling systems according to one or more example implementations of the disclosure.
Figure 5:
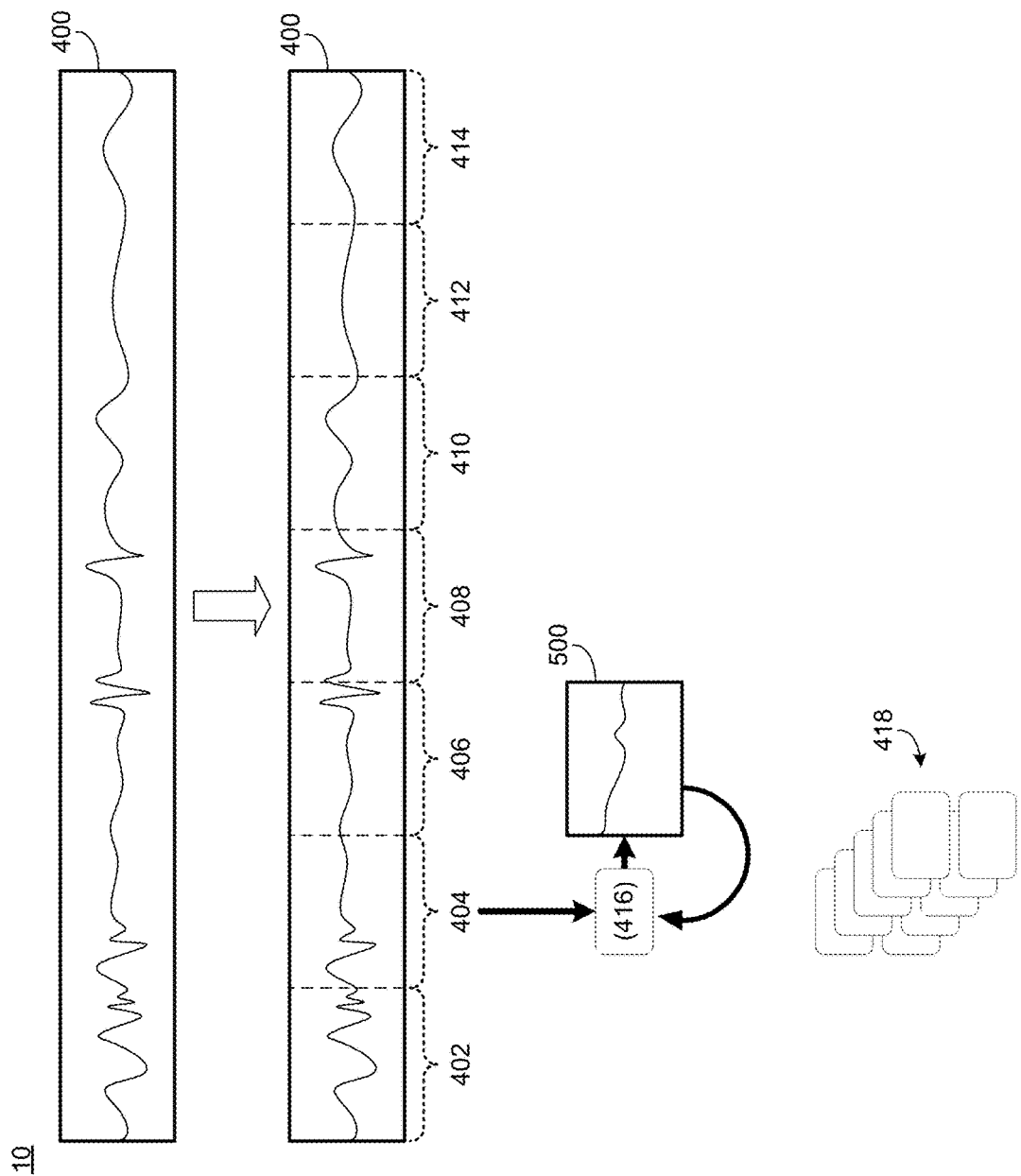
Figure 6:
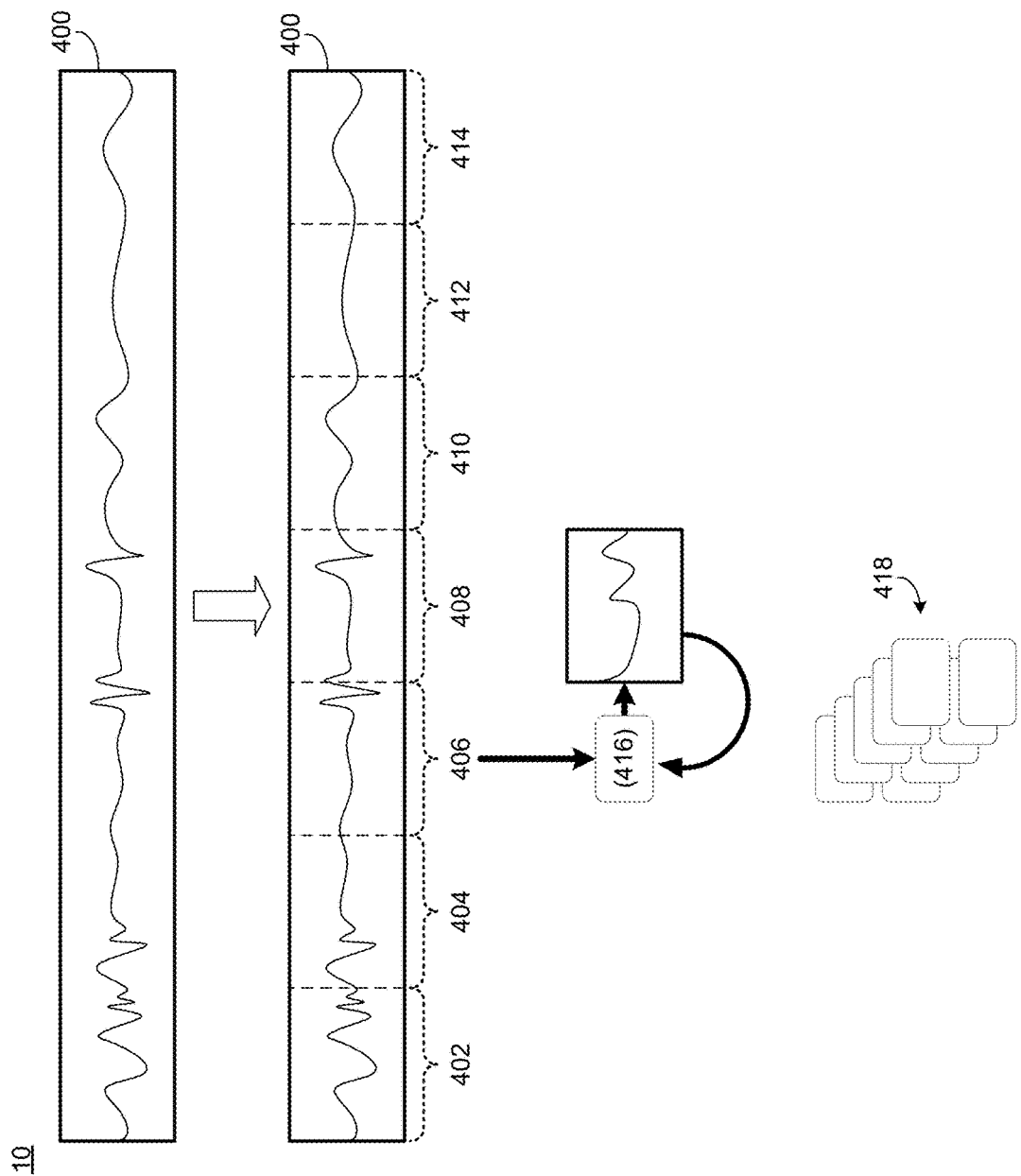
Figure 7:
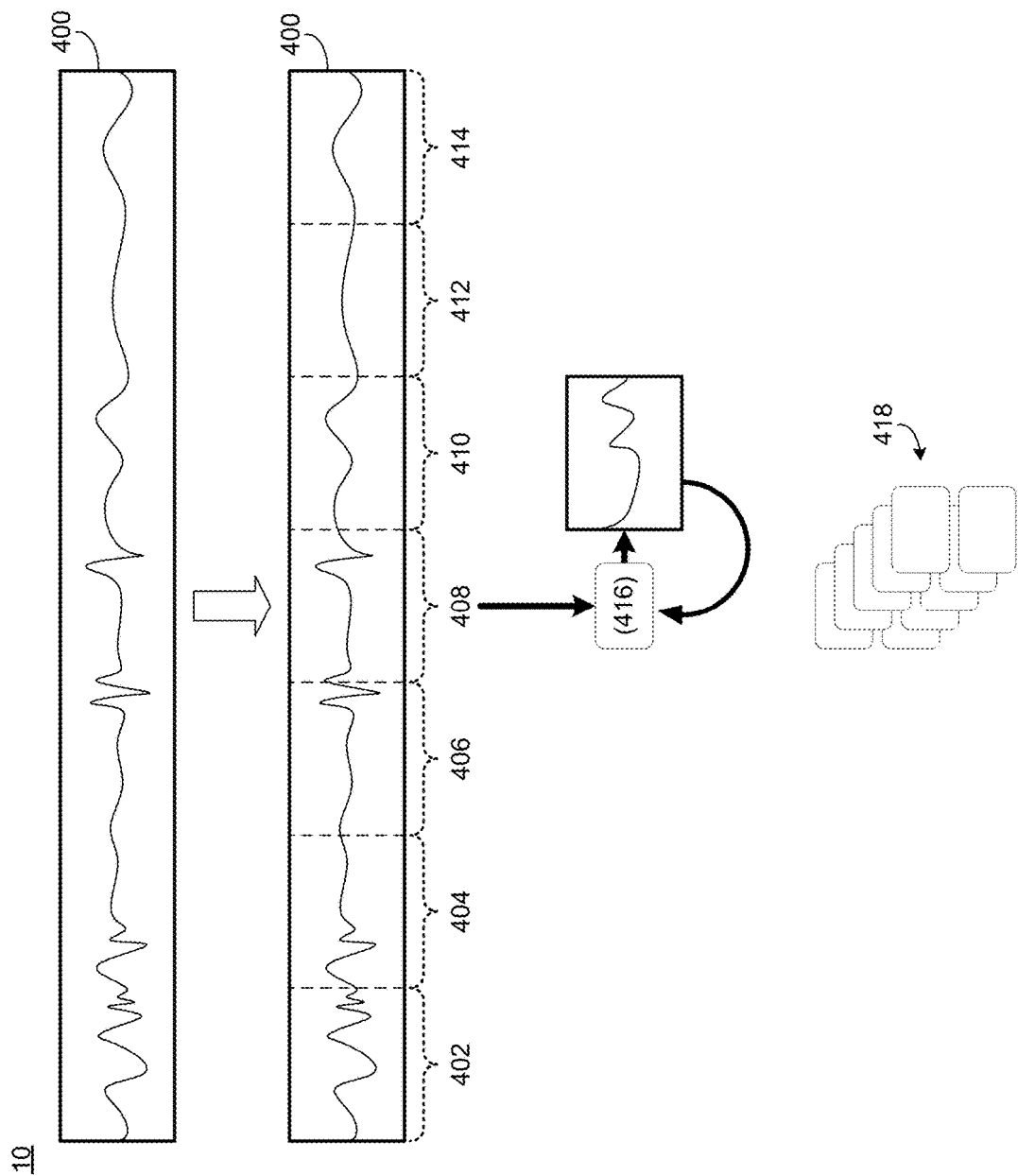
Figure 8:
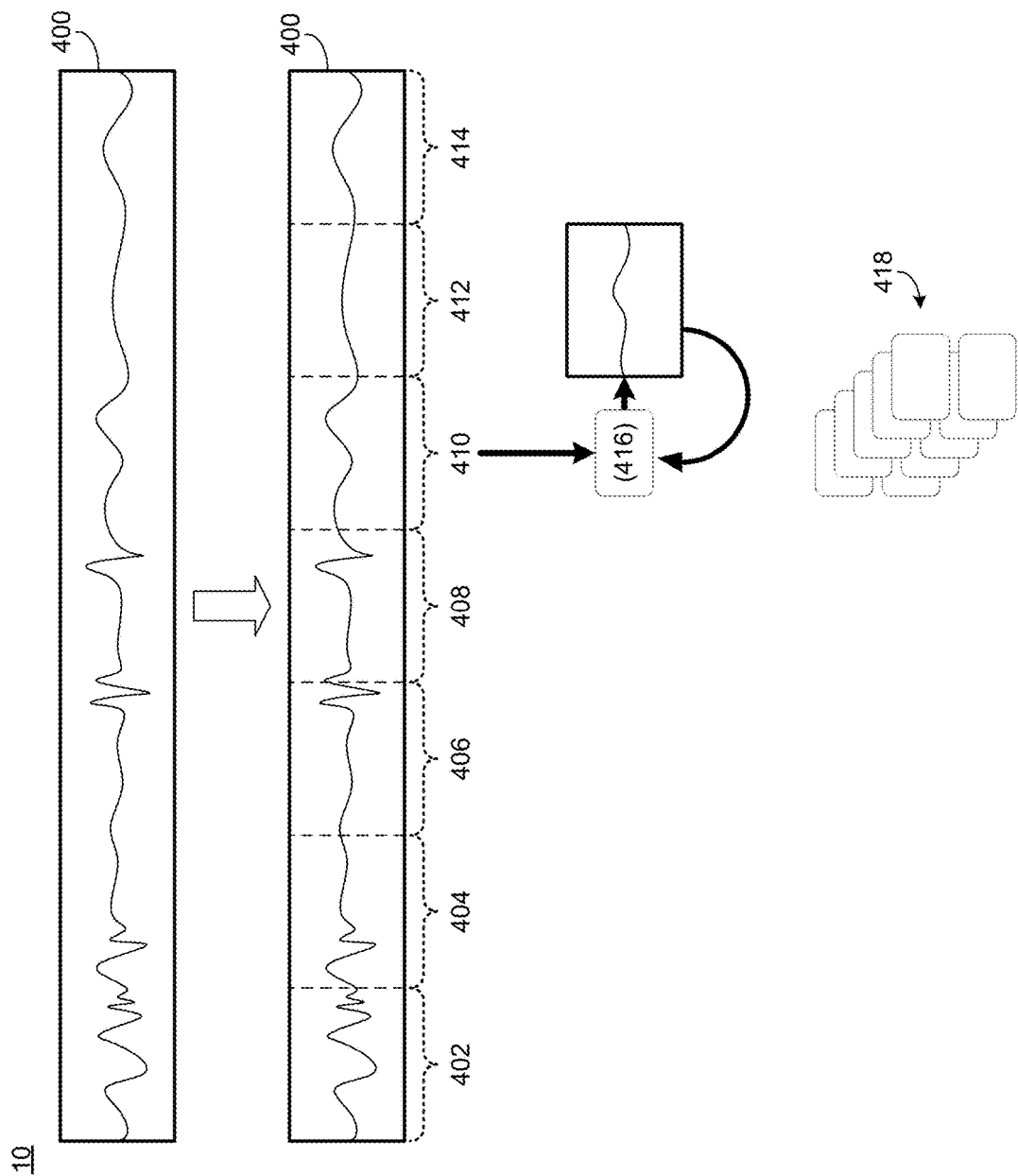

In some implementations, processing 300 the historical IO performance data may include splitting or otherwise dividing the historical IO performance data into a plurality of portions or windows. Referring also to FIG. 4, suppose performance modeling process 10 processes 300 historical IO performance data (e.g., historical IO performance data 400) for one or more storage objects of a storage system (e.g., storage system 12). In this example, performance modeling process 10 may define a plurality of portions or historical IO performance windows by dividing historical IO performance data 400. Performance modeling process 10 may split historical IO performance data 400 into any number of portions (e.g., based on a period of time (seconds, minutes, hours, days); based on a total number of portions; etc.). The number of portions may be a default value (e.g., hourly portions); a default value based on the IO performance data (e.g., for IOPS, hour-long portions); a user-defined value (e.g., provided via a graphical user interface); and/or an automatically determined value (e.g., determined dynamically and/or algorithmically via performance modeling process 10). Suppose for this example that historical IO performance data 400 shows e.g., read IOPS over a seven-month period. In this example, performance modeling process 10 may divide historical IO performance data 400 into e.g., month-long portions. As such, performance modeling process 10 may divide historical IO performance data 400 into historical IO performance data portions 402, 404, 406, 408, 410, 412, 414. It will be appreciated that this is for example purposes only and that performance modeling process 10 may divide the historical IO performance data into any number of portions within the scope of the present disclosure.

As will be discussed in greater detail below, performance modeling process 10 may use a "walk forward" approach to train and test different IO modeling systems in a "sliding-window" chronological cross validation manner. It will also be appreciated that "forward-chaining" time-series cross validation is technically supported as well. In this manner, performance modeling process 10 may iteratively train and test a plurality of IO modeling systems to account for time-series changes in historical IO performance data.

In some implementations, performance modeling process 10 may train 302 a plurality of IO modeling systems using the historical IO performance data. An IO modeling system may generally include a machine learning system or model that is configured to process input historical IO performance data to output forecast IO performance data for a particular period of time. As is known in the art, a machine learning system or model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. As is known in the art, supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). As is known in the art, reinforcement learning may generally include a computing device interacting in a dynamic environment in which it must perform a certain goal (such as driving a vehicle or playing a game against an opponent). As it navigates its problem space, the machine learning model is provided feedback that's analogous to rewards, which it tries to maximize. While three examples of machine learning approaches have been provided, it will be appreciated that other machine learning approaches are possible within the scope of the present disclosure.

In some implementations, performance modeling process 10 may train the plurality of IO modeling systems using the historical IO performance data with the same datasets and with hyperparameters defined based on the research and analysis. For example, participating IO modeling systems may be provided along with their hyper-parameters in a configuration file (e.g., configuration file 200 as shown in FIG. 2). Examples of IO modeling systems may include but are not limited to tree-based forecasting models (e.g., RandomForest, ExtreemTrees, LightGBM, etc.). Configuration for the dynamic cross-validation hyper-parameters search space for the Tree-based forecasting models' best results may be predefined (e.g., in the configuration file) and may be adjustable to the characteristics of the historical IO performance data (e.g., based on the total length, seasonal-periods, trend analysis methods, training step windows, etc.).

Training 302 the plurality of IO modeling systems using the historical IO performance data may include training 318 the plurality of IO modeling systems with a first portion of a plurality of portions of the historical IO performance data; and testing 320 the plurality of IO modeling systems with a second portion of the plurality of portions of the historical IO performance data. Referring also to FIGS. 4-10, performance modeling process 10 may train 302 a plurality of IO modeling systems (e.g., plurality of modeling IO systems 416, 418). As shown in FIG. 4, performance modeling process 10 may train 302 IO modeling system 416 using historical IO performance data 400 by training 318 IO modeling system 416 with a first portion of a plurality of portions of the historical IO performance data (e.g., historical IO performance data portion 402). Once trained, performance modeling process 10 may test 320 the plurality of IO modeling systems with a second portion of the plurality of portions of the historical IO performance data. For example, performance modeling process 10 may utilize IO modeling system 416 trained with historical IO performance data portion 402 to forecast IO performance data 420. With forecasted IO performance data 420, performance modeling process 10 may adjust the parameters of IO modeling system 416 to more accurately reflect the expected IO performance (as shown in historical IO performance data 400). As shown in FIGS. 5-10, performance modeling process 10 may iteratively repeat 322 the training 318 and testing 320 for each portion of the plurality of portions of the historical IO performance data. Performance modeling process 10 may perform this iterative training and testing on each IO modeling system of the plurality of IO modeling systems.

In some implementations, performance modeling process 10 may determine 304 modeling performance information for the plurality of IO modeling systems across the historical IO performance data. Modeling performance information may generally include the execution time; evaluation score (e.g., a plurality of accuracy scores for the IO modeling system across the historical IO performance data during the training and testing shown in FIGS. 4-10); memory consumption; etc. for each IO modeling system across the plurality of portions of the historical IO performance data. As will be discussed in greater detail below, this may enable performance modeling process 10 to minimize the selected top performing modeling systems' set size and fine-tune their performance. As a result, performance modeling process 10 may fine-tune IO modeling systems to achieve the best possible forecasting results while still being fast enough for a high scale production environment.

In some implementations, performance modeling process 10 may determine 306 a forecast score for each IO modeling system based upon, at least in part, the modeling performance information for the plurality of IO modeling systems. For example, performance modeling process 10 may generate a forecast score for each IO modeling system that represents the accuracy of the IO modeling system across the historical IO performance data. As discussed above, certain IO modeling systems may be more effective at forecasting IO performance for particular types of IO performance data (e.g., read IOPS vs. write IOPS) and/or for different periods of time (e.g., short term forecasting vs. long term forecasting). Accordingly and as will be discussed in greater detail below, performance modeling process 10 may utilize a forecast score to represent the accuracy of the IO modeling system across the historical IO performance data.

Determining 306 a forecast score for each IO modeling system based on the modeling performance information for the plurality of IO modeling systems may include determining 324 a median value of the Symmetric Mean Absolute Percentage Error across the historical IO performance data for each IO modeling system; and determining 326 a Symmetric Mean Absolute Percentage Error standard deviation for each IO modeling system. For example, performance modeling process 10 may determine, for each IO modeling system, the forecast score by determining the median value of the Symmetric Mean Absolute Percentage Error (sMAPE) on the modeling performance information through the cross-validation process. As is known in the art, sMAPE is an accuracy measure based on percentage (or relative) errors. Referring again to the examples of FIGS. 4-10, performance modeling process 10 may determine 304 modeling performance information during the training 318 and testing 320 of each IO modeling system across the historical IO performance data. The modeling performance information may include a sMAPE value measuring the accuracy of the IO modeling system as additional portions of the historical IO performance data are used for training and testing the IO modeling system. Accordingly, performance modeling process 10 may determine 306 a forecast score for each IO modeling system by determining 324 a median value of the sMAPE across the historical IO performance data (i.e., the median value of the sMAPE values determined across the historical IO performance data).

In some implementations and when data reflects major differences between past and more recent performance values, different weights may be applied to better reflect their different relevancy for future performance. For example, optional weights applied to the modeling performance information may be referred to as "momentum" weighting. Momentum weighting allows the IO modeling system to consider more heavily forecasting errors encountered when evaluating the IO modeling system's performance on the last test. As the IO modeling system approaches the end of its testing, its performance of predictions becomes clearly determinable. If the IO modeling system performance degrades, a lower weight would be given to the first (e.g., older) tests and a higher weight would be given to the latest (e.g., more recent) test.

In some implementations, various configuration parameters may govern how momentum weighting is applied. For example, a "momentum_ratio" may include a value between zero and one, where the higher the value, the more weight is applied to the modeling performance data (i.e., tests) that are different from each other. When "momentum_ratio" is zero, momentum weighting is not used. "Momentum_inverse" may be a Boolean value where "false" may be a default value indicating that higher weights are assigned to the most recent tests. A "true" value may indicate that the weights are assigned to the older tests. "Momentum_mode" may be a linear/log/exponent-constant/logarithmic/exponential (respectively) ratio to increase/decrease in weight. In one example, the following momentum weights may be assigned to e.g., six test evaluation results, when ratio=0.2, inverse=False, and mode=linear: [1.0, 1.1, 1.2, 1.3, 1.4, 1.5].

Figure 9:
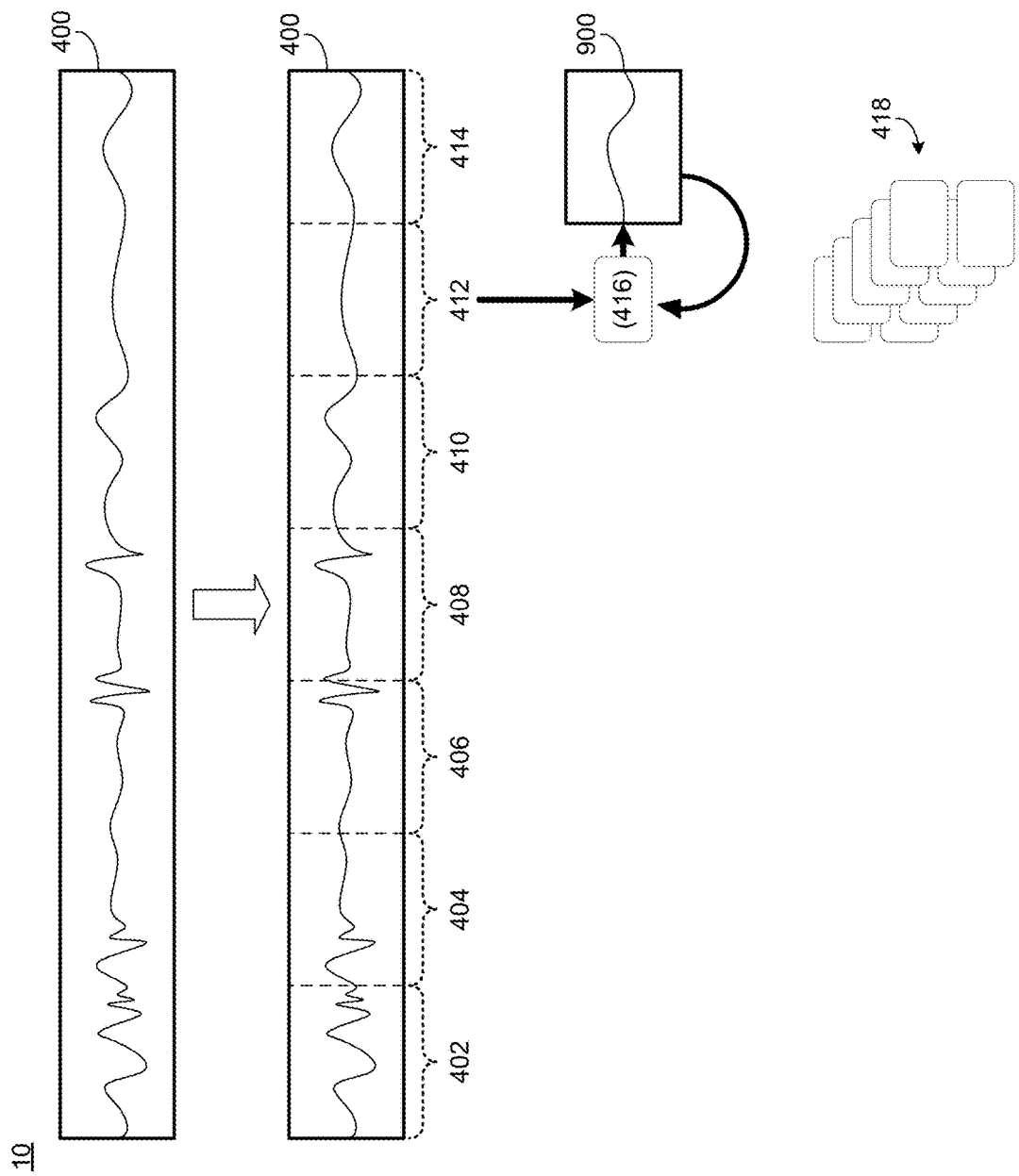
Figure 10:
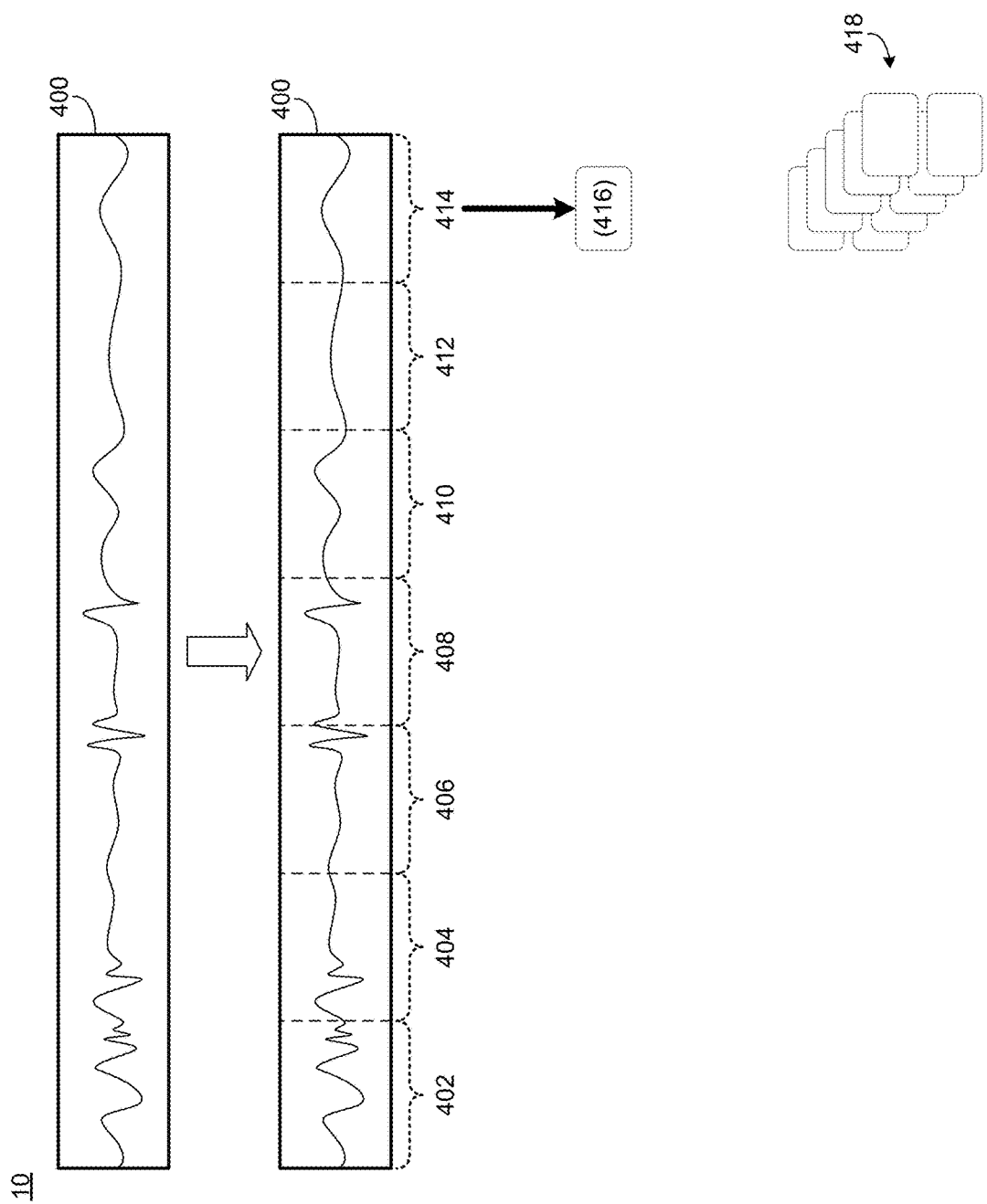

In some implementations, performance modeling process 10 may determine 326 a sMAPE standard deviation for each IO modeling system. For example, as performance modeling process 10 trains 318 and tests 320 an IO modeling system over the historical IO performance data, the accuracy may change over time. Referring again to FIG. 5, suppose that performance modeling process 10 trains 318 IO modeling system 416 with historical IO performance data portions 402 and 404. In this example, IO modeling system 416 may be tested 320 by forecasting the IO performance for a particular period of time in the future. However, as shown in the difference between historical IO performance portion 406 and the forecast IO performance 500, the accuracy of IO performing model 416 may change (i.e., be more or less accurate) over time. In this example, while forecast IO performance 500 generally represents the majority of historical IO performance data portion 406, forecast IO performance 500 does not accurately capture the spikes as shown at the end of historical IO performance data portion 406. By contrast, forecast IO performance 900 of FIG. 9 is an accurate representation of historical IO performance data portion 414. Accordingly, performance modeling process 10 may represent these changes in accuracy over time by determining 326 a sMAPE standard deviation for each IO modeling system.

In some implementations, performance modeling process 10 may select 308 a subset of the plurality of IO modeling systems based upon, at least in part, the forecast score for each IO modeling system. For example, performance modeling process 10 may utilize the forecast score for each IO modeling system and/or the sMAPE standard deviation for each IO modeling system to compare the plurality of IO modeling systems across the historical IO performance data.

In some implementations, selecting 308 a subset of the plurality of IO modeling systems based upon, at least in part, the forecast score for each IO modeling system may include selecting 328 the subset of the plurality of IO modeling systems based upon, at least in part, the median value of the Symmetric Mean Absolute Percentage error across the historical IO performance data for each IO modeling system and the Symmetric Mean Absolute Percentage Error standard deviation for each IO modeling system. In one example, performance modeling process 10 may select 328 a predefined number (e.g., three) of IO modeling systems with the lowest forecast score (i.e., the lowest median sMAPE) out of e.g., 50% of the plurality of IO modeling systems within the lower sMAPE's 90th percentile (i.e., lower mean and variance). In this example, performance modeling process 10 may rank the top three performing IO modeling systems according to their sMAPE's 90th percentile. Performance modeling process 10 may select the IO modeling system with the lowest sMAPE's 90th percentile to be the "top performing forecaster" IO modeling system. While examples have been provided of using e.g., the sMAPE's 90th percentile to select 328 the subset of IO modeling systems, it will be appreciated that other metrics or thresholds (e.g., default and/or user-defined thresholds) may be used within the scope of the present disclosure. As will be discussed in greater detail below, performance modeling process 10 may utilize the subset of IO modeling systems to determine a target IO modeling system for forecasting IO performance data when there are changes in the actual IO performance data received by the storage system. In this manner, performance modeling process 10 may reduce the number of times resource-consuming retraining of the plurality of IO modeling systems is performed when forecasting IO performance data for one or more storage objects compared to previous solutions.

Figure 11:
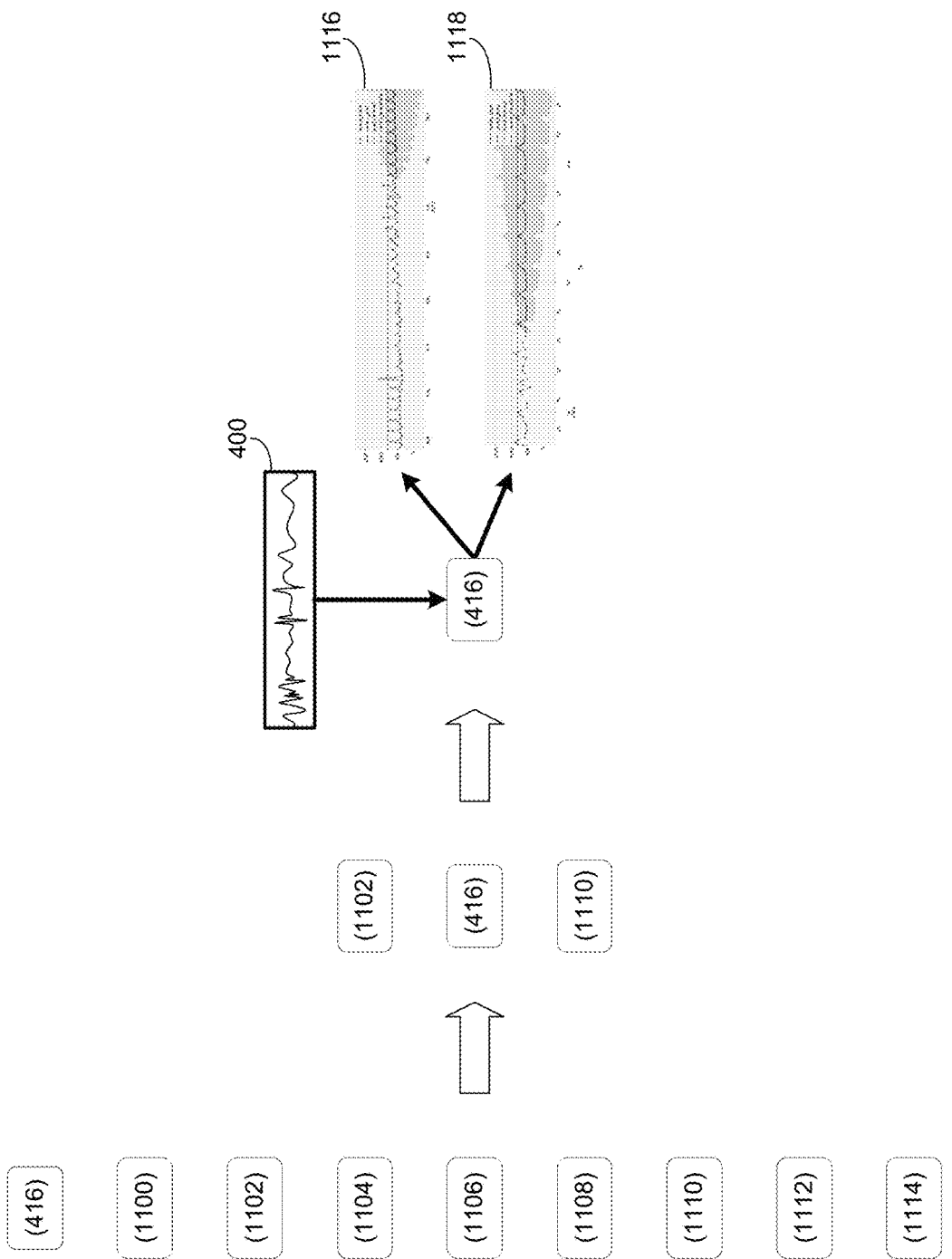
FIG. 11 is an example diagrammatic view of the selection of a subset of IO modeling systems according to one or more example implementations of the disclosure.

Referring also to FIG. 11, suppose performance modeling process 10 trains 318 and tests 320 a plurality of IO modeling systems (e.g., IO modeling systems 416, 1100, 1102, 1104, 1106, 1108, 1110, 1112, 1114) in the manner described above and determines a forecast for each IO modeling system. In this example, performance modeling process 10 may select 328 a predefined number of IO modeling systems based upon, at least in part, the median value of the Symmetric Mean Absolute Percentage error across the historical IO performance data for each IO modeling system and the Symmetric Mean Absolute Percentage Error standard deviation for each IO modeling system. In this example, suppose that performance modeling process 10 selects 328 IO modeling systems 416, 1102, and 1110 based upon, at least in part, the median value of the sMAPE error across the historical IO performance data for each IO modeling system and the sMAPE standard deviation for each IO modeling system. Performance modeling process 10 may select IO modeling system 416 as the top ranking IO modeling system of IO modeling systems 416, 1102, and 1110. While this example includes e.g., nine initial IO modeling systems and a subset of e.g., three IO subsystems, it will be appreciated that these values are for example purposes only and that performance modeling process 10 may utilize any number of initial IO modeling systems and any number of IO subsystems within the focused subset of IO modeling systems within the scope of the present disclosure.

In some implementations, performance modeling process 10 may train 310 at least one IO modeling system from the subset of the plurality of IO modeling systems using the historical IO performance data. For example, the top performing IO modeling system may be finally retrained using the historical IO performance data and used to make the required IO performance forecast. Additionally, performance modeling process 10 may save this IO modeling system for future use (i.e., as long as there is no need to retrain the IO modeling system).

In some implementations, performance modeling process 10 may forecast 312 IO performance data for the one or more storage objects using the at least one trained IO modeling system from the subset of the plurality of IO modeling systems. The forecasted IO performance data may provide insights about the storage system's performance in terms of the host activity. For example, performance modeling process 10 may forecast both the short-term and the long-term analysis of the IO performance data where the short-term analysis may provide the forecast for e.g., the next seven days while the long-term analysis may provide forecast results for e.g., the next year. It will be appreciated the exact scope of the "short-term" and/or the "long-term" may be individually determined for each storage system and/or each forecasting of IO performance data. In some implementations, the combined short-term and long-term forecasted IO performance data may be robust enough to support different platform types and scales to support other metrics (e.g., power consumption, processing power, device longevity, etc.). Referring again to FIG. 11, performance modeling process 10 may train 310 IO modeling system 416 with historical IO performance data 400 (e.g., six months of hourly monitored historical data) to forecast 312 short-term IO performance data (e.g., long-term IO performance data 1116) and/or long-term IO performance data (e.g., short-term IO performance data 1118).

Figure 12:
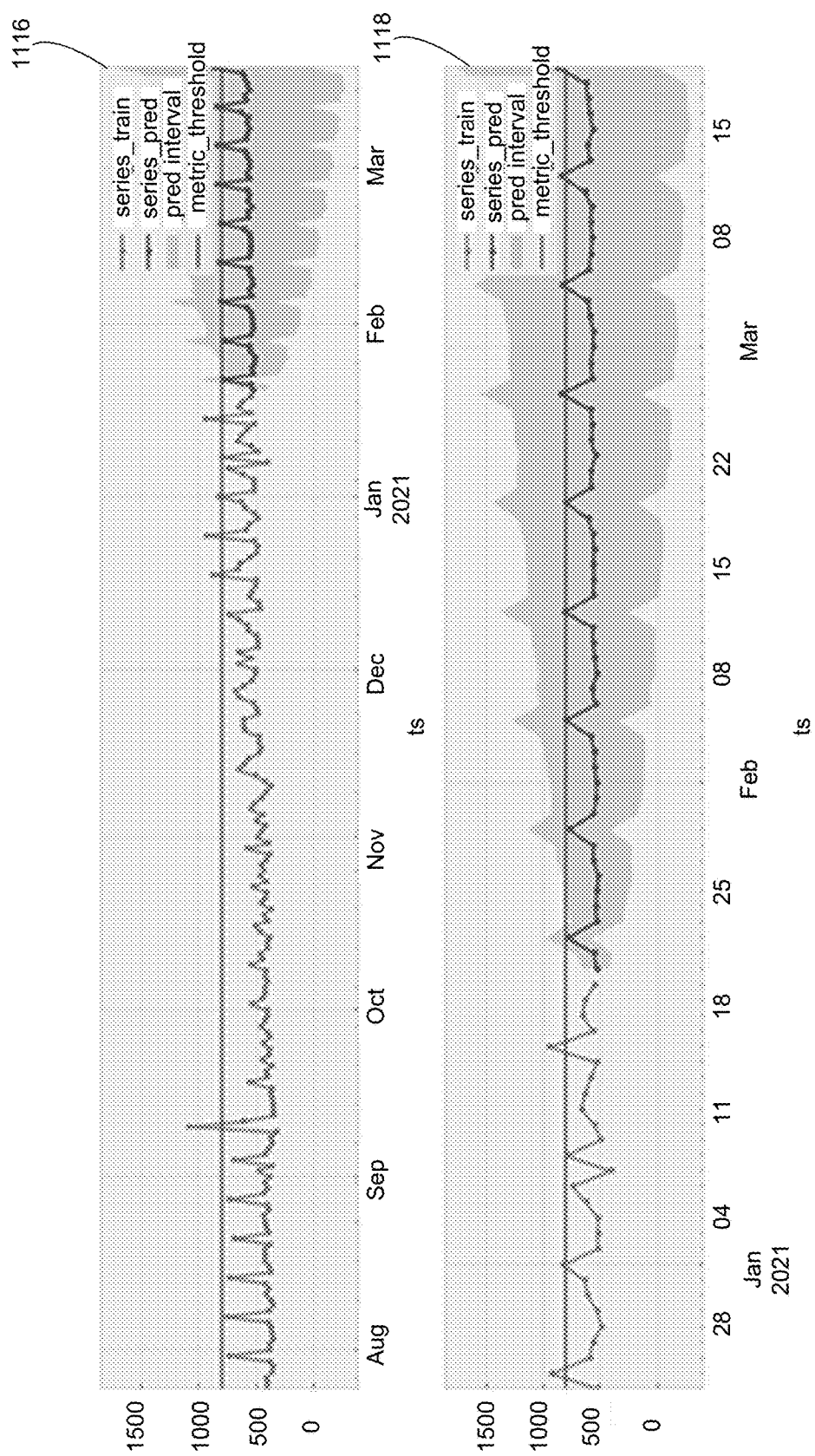
FIG. 12 is an example diagrammatic view of forecasted IO performance data for a storage system according to one or more example implementations of the disclosure.

Referring also to FIG. 12, exemplary long-term IO performance data 1116 and short-term IO performance data 1118 are shown. In this example, starting from e.g., January 20 are the forecasted values after learning the historical time series data's trend and seasonality. Considering the historical data's intrinsic variance, the surrounding cone shape bounds the most probable future value range at every future time point. For the forecasted time frame of e.g., 60 days, it is clear that the IO modeling system (e.g., IO modeling system 416) correctly captured the mild data change trend to go up as time progresses.

In some implementations, performance modeling process 10 may utilize the forecasted IO performance data for the one or more storage objects to perform a remedial action. For example, performance modeling process 10 may compare the forecasted IO performance data to one or more predefined thresholds to determine whether remedial action is warranted. In one example, performance modeling process 10 may define performance "headroom" for the one or more storage objects of the storage system. Performance headroom may generally include an indicator of additional IOPS a storage system or portions of a storage system can handle at any given time before reaching the saturation limit. Available headroom may be an instantaneous value, and no historical data may be involved. Its value may increase or decrease as the host IO workload increases or decreases. Performance headroom may be calculated as a range with lower and upper bounds. The lower bound may be the threshold that indicates that potential problems may arise in the future if IO performance continues to cross the lower bound value. The upper bound may represents the maximum predicted system utilization.

Referring again to FIG. 12, the storage system (e.g., storage system 12) is forecasted by IO modeling system 416 to cross the headroom value (i.e., the generally straight line on both long-term IO performance data 1116 and short-term IO performance data 1118) periodically, indicating that there might be a need for remedial action (e.g., storage administrator intervention, notifications provided, storage system properties automatically adjusted, etc.) to avoid low system performance or costly downtime. In this example, performance modeling process 10 may utilize one or more predefined IO performance thresholds to determine which remedial action, if any, should be taken in response to the forecasted IO performance data.

In some implementations, performance modeling process 10 may receive 330 new IO performance data for the one or more storage objects. For example, suppose that following the forecasting of the IO performance data (e.g., long-term IO performance data 1116 and short-term IO performance data 1118) via IO modeling system 416, storage system 12 receives additional IO requests for some predefined period of time (e.g., an hour, a day, a month, a year, etc.). Performance modeling process 10 may receive 330 new IO performance data associated with the processing of these IO requests over the predefined period of time and/or performance modeling process 10 may generate the new IO performance data representative of the processing of these IO requests over the predefined period of time.

Performance modeling process 10 may determine 332 whether to retrain the at least one trained IO modeling system based upon, at least in part, one or more of: a comparison of the historical IO performance data to the new IO performance data for the one or more storage objects; and a performance degradation of the at least one trained IO modeling system with the new IO performance data for the one or more storage objects. For example, as new IO performance data is received 330, performance modeling process 10 may determine whether the forecasted IO performance data provided by IO modeling system 416 is sufficiently accurate. In order to minimize exhaustive and potentially wasteful retraining (in terms of computing resources and time), performance modeling process 10 may determine 332 whether to retrain the at least one trained IO modeling system by determining a comparison of the historical IO performance data to the new IO performance data for the one or more storage objects. For example, performance modeling process 10 may define a "data drift ratio" as the difference between the new IO performance data to the historical IO performance data the previously trained model was trained on. In one example, the data drift ratio may include a ratio of new IO performance data values (e.g., read IOPS, write IOPS, latency, etc.) to the corresponding historical IO performance data over a predefined period of time (e.g., an hour, a day, a month, a year, etc.).

Performance modeling process 10 may also determine 332 whether to retrain the at least one trained IO modeling system by determining a performance degradation of the at least one trained IO modeling system with the new IO performance data for the one or more storage objects. For example, performance modeling process 10 may compare the pre-trained IO modeling system's performance (i.e., long-term IO performance data 1116 and short-term IO performance data 1118) against the new IO performance data. In one example, performance modeling process 10 may determine the performance degradation of the at least one trained IO modeling system as a function of error between the forecasted IO performance data and the new IO performance data.

In some implementations, performance modeling process 10 may determine 332 whether to retrain the at least one trained IO modeling system by comparing the data drift ratio and/or the performance degradation value to one or more predefined thresholds. For example, performance modeling process 10 may utilize one or more predefined thresholds to determine whether or not to retrain the at least one trained IO modeling system and/or to determine the degree of retraining required. For example, performance modeling process 10 may determine 332 that the at least one IO modeling system needs to be "lightly" retrained when a predefined threshold is passed within a limited range. In this example, performance modeling process 10 may select a certain number of highest performing models (as discussed above) from the subset of IO modeling systems to perform fast retrain and forecast on the new data. Similarly, performance modeling process 10 may determine 332 that the at least one IO modeling system needs to be completely retrained when a profound data drift ratio is determined, or a major performance degradation is identified. While examples of two degrees of retraining have been described, it will be appreciated that these are for example purposes only and that any number of degrees of retraining for any number of or type of predefined threshold may be used within the scope of the present disclosure. Additionally, it will be appreciated that the one or more predefined thresholds may be default values, user-defined values, and/or automatically determined by performance modeling process 10.

In some implementations and to further minimize the "cold-start" initiation for forecasting IO performance for a new storage system and/or new storage objects using the above-described process, a classification machine learning model may filter one or more IO modeling systems from participating in the above-described process in the initial fit stage, and keep only the most promising ones based on the unique characteristics of the new storage system and/or storage objects. The machine learning model may be trained on information collected from other storage systems and/or storage objects of those storage systems that already use the particular IO modeling system. This approach may improve the process of forecasting IO performance data for new storage systems and/or storage objects in terms of processing speed and time.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed by a processor on a computing device, comprising:
    processing historical input/output (IO) performance data associated with one or more storage objects of a storage system;
    training a plurality of IO machine learning modeling systems using the historical IO performance data;
    determining modeling performance information for the plurality of IO machine learning modeling systems across the historical IO performance data;
    determining a forecast score for each IO machine learning modeling system based upon, at least in part, the modeling performance information for the plurality of IO machine learning modeling systems;
    selecting a subset of the plurality of IO machine learning modeling systems based upon, at least in part, the forecast score for each IO machine learning modeling system;
    training at least one IO machine learning modeling system from the subset of the plurality of IO machine learning modeling systems using the historical IO performance data;
    receiving new IO performance data for the one or more storage objects; and
    determining whether to retrain the at least one trained IO machine learning modeling system based upon, at least in part, one or more of:
        a comparison of the historical IO performance data to the new IO performance data for the one or more storage objects; and
        a performance degradation of the at least one trained IO machine learning modeling system with the new IO performance data for the one or more storage objects.

2. The computer-implemented method of claim 1, further comprising:
    forecasting IO performance data for the one or more storage objects using the at least one trained IO machine learning modeling system from the subset of the plurality of IO machine learning modeling systems.

3. The computer-implemented method of claim 1, wherein processing historical input/output (IO) performance data associated with one or more storage objects of a storage system includes one or more of:
    removing one or more duplicate portions of historical IO performance data; and
    performing time-series interpolation on the historical IO performance data.

4. The computer-implemented method of claim 1, wherein training a plurality of IO machine learning modeling systems using the historical IO performance data includes:
    training the plurality of IO machine learning modeling systems with a first portion of a plurality of portions of the historical IO performance data; and
    testing the plurality of IO machine learning modeling systems with a second portion of the plurality of portions of the historical IO performance data.

5. The computer-implemented method of claim 4, further comprising:
    iteratively repeating the training and testing for each portion of the plurality of portions of the historical IO performance data.

6. The computer-implemented method of claim 1, wherein determining a forecast score for each IO machine learning modeling system based on the modeling performance information for the plurality of IO machine learning modeling systems includes:
    determining a median value of the Symmetric Mean Absolute Percentage Error across the historical IO performance data for each IO machine learning modeling system; and
    determining a Symmetric Mean Absolute Percentage Error standard deviation for each IO machine learning modeling system.

7. The computer-implemented method of claim 5, wherein selecting a subset of the plurality of IO machine learning modeling systems based upon, at least in part, the forecast score for each IO machine learning modeling system includes:
    selecting the subset of the plurality of IO machine learning modeling systems based upon, at least in part, the median value of the Symmetric Mean Absolute Percentage error across the historical IO performance data for each IO machine learning modeling system and the Symmetric Mean Absolute Percentage Error standard deviation for each IO machine learning modeling system.

8. A computer program product residing on a non-transitory computer readable medium having a plurality of instructions stored thereon which, when executed by a processor, cause the processor to perform operations comprising:
    processing historical input/output (IO) performance data associated with one or more storage objects of a storage system;
    training a plurality of IO machine learning modeling systems using the historical IO performance data;
    determining modeling performance information for the plurality of IO machine learning modeling systems across the historical IO performance data;
    determining a forecast score for each IO machine learning modeling system based on the modeling performance information for the plurality of IO machine learning modeling systems;

selecting a subset of the plurality of IO machine learning modeling systems based upon, at least in part, the forecast score for each IO machine learning modeling system;

training at least one IO machine learning modeling system from the subset of the plurality of IO machine learning modeling systems using the historical IO performance data;

receiving new IO performance data for the one or more storage objects; and determining whether to retrain the at least one trained IO machine learning modeling system based upon, at least in part, one or more of:

a comparison of the historical IO performance data to the new IO performance data for the one or more storage objects; and a performance degradation of the at least one trained IO machine learning modeling system with the new IO performance data for the one or more storage objects.

9. The computer program product of claim 8, wherein the operations further comprise:

forecasting IO performance data for the one or more storage objects using the at least one trained IO machine learning modeling system from the subset of the plurality of IO machine learning modeling systems.

10. The computer program product of claim 8, wherein processing historical input/output (IO) performance data associated with one or more storage objects of a storage system includes one or more of:

removing one or more duplicate portions of historical IO performance data; and performing time-series interpolation on the historical IO performance data.

11. The computer program product of claim 8, wherein training a plurality of IO machine learning modeling systems using the historical IO performance data includes:

training the plurality of IO machine learning modeling systems with a first portion of a plurality of portions of the historical IO performance data; and testing the plurality of IO machine learning modeling systems with a second portion of the plurality of portions of the historical IO performance data.

12. The computer program product of claim 11, wherein the operations further comprise:

iteratively repeating the training and testing for each portion of the plurality of portions of the historical IO performance data.

13. The computer program product of claim 8, wherein determining a forecast score for each IO machine learning modeling system based on the modeling performance information for the plurality of IO machine learning modeling systems includes:

determining a median value of the Symmetric Mean Absolute Percentage Error across the historical IO performance data for each IO machine learning modeling system; and determining a Symmetric Mean Absolute Percentage Error standard deviation for each IO machine learning modeling system.

14. The computer program product of claim 13, wherein selecting a subset of the plurality of IO machine learning modeling systems based upon, at least in part, the forecast score for each IO machine learning modeling system includes:

selecting the subset of the plurality of IO machine learning modeling systems based upon, at least in part, the median value of the Symmetric Mean Absolute Percentage error across the historical IO performance data for each IO machine learning modeling system and the Symmetric Mean Absolute Percentage Error standard deviation for each IO machine learning modeling system.

15. A computing system comprising:

a memory; and a processor configured to process historical input/output (IO) performance data associated with one or more storage objects of a storage system, wherein the processor is further configured to train a plurality of IO machine learning modeling systems using the historical IO performance data, wherein the processor is further configured to determine modeling performance information for the plurality of IO machine learning modeling systems across the historical IO performance data, wherein the processor is further configured to determine a forecast score for each IO machine learning modeling system based on the modeling performance information for the plurality of IO machine learning modeling systems, wherein the processor is further configured to select a subset of the plurality of IO machine learning modeling systems based upon, at least in part, the forecast score for each IO machine learning modeling system, wherein the processor is further configured to train at least one IO machine learning modeling system from the subset of the plurality of IO machine learning modeling systems using the historical IO performance data, wherein the processor is further configured to receive new IO performance data for the one or more storage objects, and wherein the processor is further configured to determine whether to retrain the at least one trained IO machine learning modeling system based upon, at least in part, one or more of: a comparison of the historical IO performance data to the new IO performance data for the one or more storage objects; and a performance degradation of the at least one trained IO machine learning modeling system with the new IO performance data for the one or more storage objects.

16. The computing system of claim 15, wherein the processor is further configured to:

forecast IO performance data for the one or more storage objects using the at least one trained IO machine learning modeling system from the subset of the plurality of IO machine learning modeling systems.

17. The computing system of claim 15, wherein processing historical input/output (IO) performance data associated with one or more storage objects of a storage system includes one or more of:

removing one or more duplicate portions of historical IO performance data; and performing time-series interpolation on the historical IO performance data.

18. The computing system of claim 15, wherein training a plurality of IO machine learning modeling systems using the historical IO performance data includes:

training the plurality of IO machine learning modeling systems with a first portion of a plurality of portions of the historical IO performance data; and testing the plurality of IO machine learning modeling systems with a second portion of the plurality of portions of the historical IO performance data.

* * * * *